United States Patent Office 3,231,757
Patented Jan. 25, 1966

3,231,757
DISCONTINUOUS REGULATOR OF CONSTANT SWITCHING FREQUENCY
Erich Rainer, Nurnberg, and Erich Krestel, Erlangen, Germany, assignors to Siemens-Schuckertwerke Aktiengesellschaft, Berlin-Siemensstadt, Germany, a corporation of Germany
Filed Nov. 30, 1962, Ser. No. 241,264
Claims priority, application Germany, Dec. 1, 1961, S 76,929
3 Claims. (Cl. 307—88.5)

Our invention relates to regulating feedback systems of the discontinuous or on-off type in which the physical magnitude being regulated is maintained substantially between given minimum and maximum values (two-point regulator), and a switching operation occurs when an error signal exceeds a critical value, with the result of varying the regulated magnitude in the sense required to keep it within the prescribed limits.

There are known feedback regulators of such discontinuous type that operate with electronic circuits and generate switch-control pulse voltages of rectangular wave shape whose keying ratio depends upon the magnitude of the error signal. Some of these known regulators operate with a constant pulse frequency. For this purpose, as a rule, the error voltage, indicating the departure of the actual physical magnitude from a desired datum value, is additively combined with a saw-tooth voltage of constant frequency to provide a sum voltage which periodically opens and closes an electronic switch, for example a transistor, in a keying ratio dependent upon such departure. During each cycle period of the sum voltage, the closing interval of the electronic switch increases with decreasing values of the magnitude to be regulated and with correspondingly increasing values of the departure or error signal.

Due to the limited switching power capacity of transistors, additional amplifying means are usually required for providing a sufficient switch-controlled power output. In practice, such discontinuous regulators may also encounter difficulties on account of the fact that the switching of the transistor or other semiconductor device by the sum voltage requires an appreciable finite switching time so that in some cases the power capacity of the transistor cannot be fully utilized in order to avoid excessive heating.

It is an object of our invention to eliminate these disadvantages and to provide a discontinuous electronic regulator that, with the aid of relatively simple circuit means, affords a high control power output conjointly with a high regulating accuracy.

To this end, and in accordance with a feature of our invention, we connect the control or firing circuit of the electronic switching component with a trigger amplifier to be actuated by the above-mentioned sum voltage, and we further superimpose upon the sum voltage a train of periodic resetting pulses of such an amplitude, with respect to the amplitude of the sum voltage, that the resultant signal applied to the trigger amplifier drops below the drop-off voltage of the trigger amplifier not later than at the beginning of each cycle period.

The provision of the trigger amplifier secures a more rapid switching of the electronic switching component and thus secures a high flank steepness of the resulting switching pulses. This permits using electronic switching devices of thyratron type that are fired by a pulse applied to the control or gate electrode and then continue conducting current until the voltage across the main electrodes becomes equal to, or is reduced nearly to the zero value. Among this group of applicable electronic switching components are particularly the semiconductor controlled rectifiers, especially silicon controlled rectifiers and similar four-layer p-n-p-n junction devices.

According to a preferred feature of our invention, therefore, the electronic switching means in a regulator system as set forth above comprises a semiconductor controlled rectifier (SCR) which has its firing or gate electrode connected to the above-mentioned trigger amplifier and whose main electrode path is also connected to an extinction-pulse generator so that the trigger amplifier and the extinction-pulse generator cooperate to periodically turn the thyratron semiconductor switch on and off.

According to another feature of our invention, we further provide the regulator system with a square-wave oscillator to which the saw-tooth generator, the resetting pulse generator and the extinction pulse generator are all connected so that these three generators operate at the same frequency and in the proper time relation to each other, being all driven from the square-wave oscillator. According to another, more specific feature, we further provide rectifying means between the square-wave oscillator and the individual amplifiers and other circuit components for thus deriving the necessary feeder voltage from the same square-wave oscillator.

The invention will be further described and explained with reference to the embodiment of a discontinuous-type regulator system illustrated by way of example is the accompanying drawings, in which.

Figure 1:
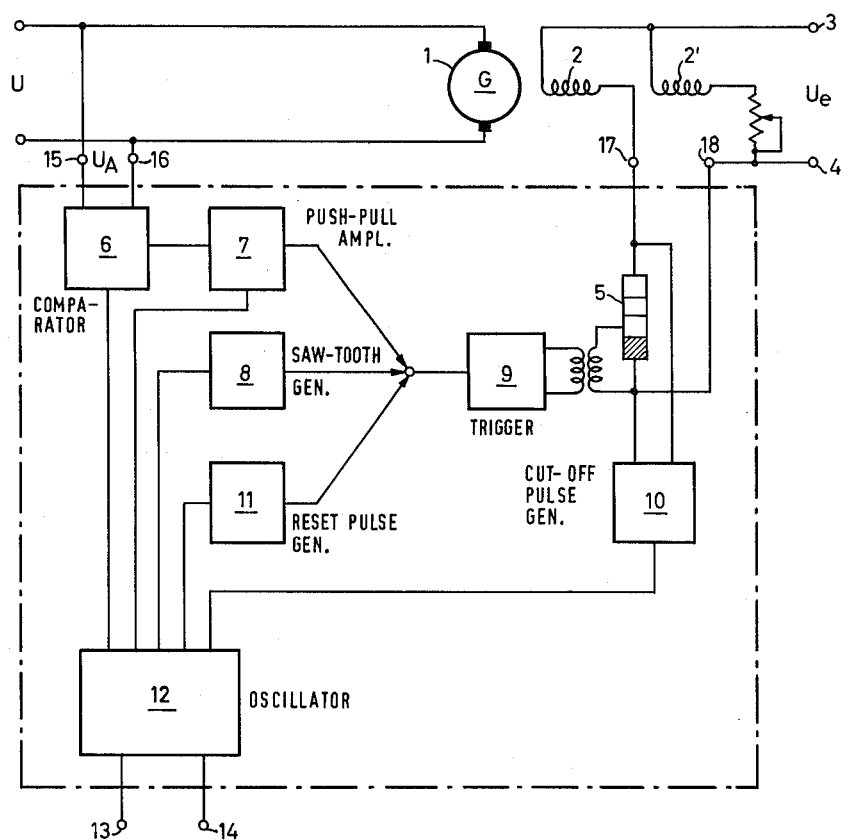
FIG. 1 is a schematic block diagram of an embodiment of the regulator system of the present invention applied for regulating the voltage of a direct-current generator.

Shown in FIG. 1 is a dynamo-electric generator G whose armature 1 is connected to direct-current busses, for example of a power line for lighting purposes. The generated voltage is to remain substantially constant. The generator is provided with one or more field windings of which only a constantly excited main winding 2' and a control winding 2 are shown. Winding 2' is excited from terminals 3, 4 by constant excitation voltage through an adjusting rheostat and serves to provide normal excitation corresponding to a value of the generated voltage at or somewhat below the rated minimum. The controal field winding 2 is connected to the excitation terminals 3 and 4 in series with an electronic switch consisting of a silicon controlled rectifier 5.

The armature voltage $U_A$ of the generator in the illustrated embodiment is directly employed as pilot signal and, for this purpose, is connected to the input terminals 15, 16 of a regulator system in which it is impressed upon a comparator network 6 to be compared with a reference or pattern voltage. The differential error signal, being proportional to the departure of the generated voltage from the datum value set by the reference voltage, is impressed upon a push-pull amplifier 7. The output voltage from amplifier 7 is superimposed upon a saw-tooth voltage from a saw-tooth generator 8 of constant frequency, and also upon the output pulses of a resetting pulse generator 11. The resulting sum voltage controls a trigger amplifier 9, preferably a flip-flop, which furnishes a firing pulse through a coupling transformer to the gate-electrode circuit of the semiconductor switching device 5. A cut-off (extinction) pulse generator 10 has its output circuit connected across the main current path of the semiconductor device 5 and serves for periodically supplying voltage pulses in opposition to the plate voltage thus momentarily reducing it substantially to zero and thereby periodically extinguishing the switching device 5. The generators 8, 10 and 11 are all connected to the squarewave oscillator 12 which thus prescribes the operating frequency of all of these generators. The oscillator 12 is energized from a direct current source through terminals 13 and 14. The output terminals 17 and 18 of the regulator are series-connected in the circuit of the generator control field winding 2.

Figure 2:
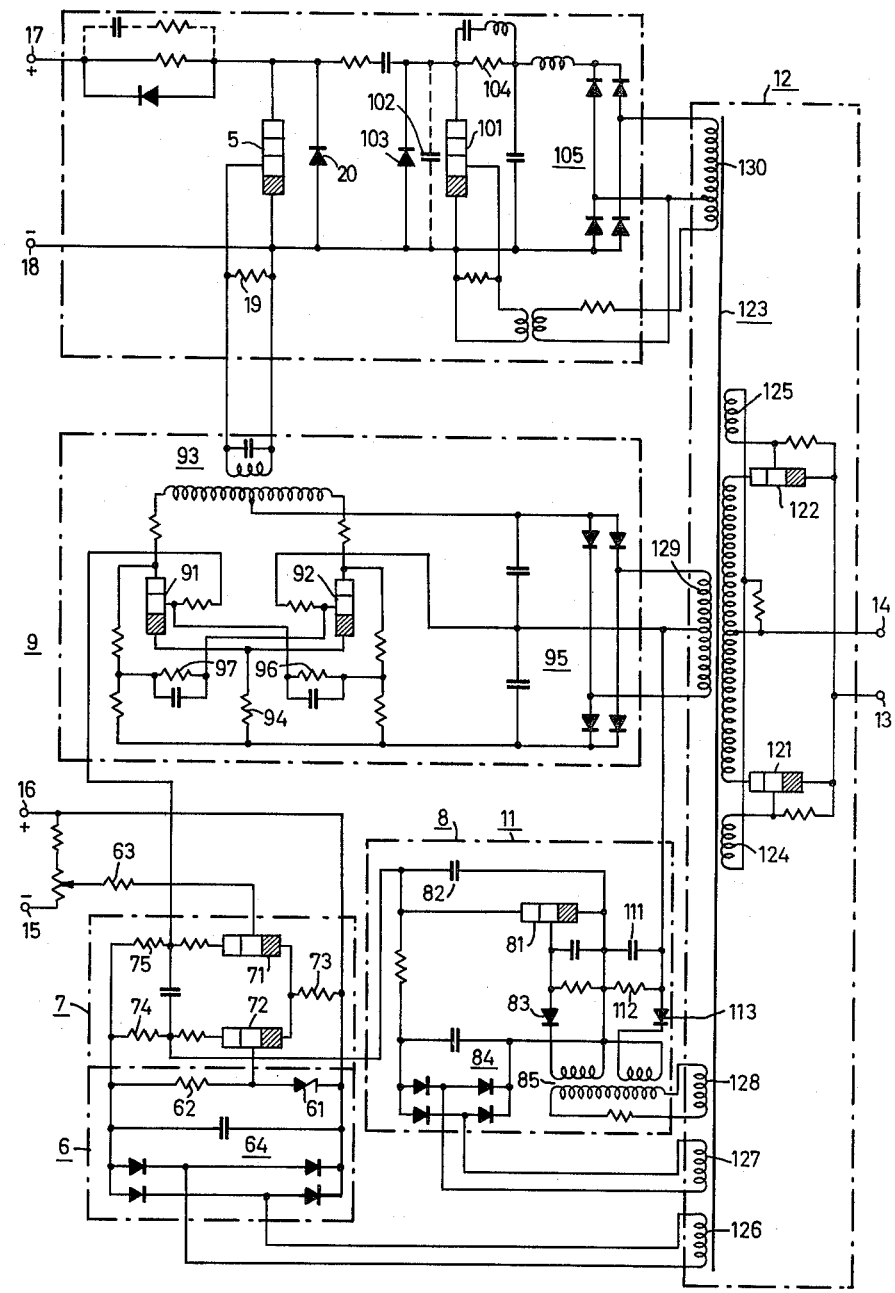
FIG. 2 is a circuit diagram of the embodiment of the regulating system of FIG. 1.

Details of the regulator system will now be described with reference to FIG. 2. The comparator network 6 comprises a Zener diode 61 in series with a resistor 62. Diode 61 and resistor 62 form a voltage divider across a rectifier bridge network 64 which is provided with smoothing means represented by a capacitor and which is energized from a transformer secondary winding 126 of the square-wave oscillator 12. The signal input terminal 16 is connected through a resistor 63 to the base electrode of a transistor 71 which forms part of the push-pull amplifier 7. The base electrode of the other transistor 72 in the same amplifier is connected to the Zener diode 61. The push-pull amplifier 7 comprises an emitter resistor 73 common to both transistors 71 and 72 which are separately connected with respective collector-circuit resistors 74 and 75. The output voltage of the amplifier 7 appears in positive or negative polarity at the respective collector circuits between the transistors 71, 72 and the respective resistors 75 and 74.

The saw-tooth generator 8 is energized through a rectifier 84 with smoothing means from another transformer secondary winding 127 of the square-wave oscillator 12 and comprises a charging capacitor 82, a transistor 81 and a diode 83. Only one polarity of the pulses furnished from the secondary winding 128 of transformer 123 in oscillator 12 and passing through a pulse transformer 85 in the saw-tooth generator 8 can pass through the diode 83 to the base of the transistor 81, the half waves of the other polarity of this pulse being suppressed.

The reset pulse generator 11 is connected through the pulse transformer 85 to the same secondary winding 128 of the transformer 123 in oscillator 12 and comprises a capacitor 111, a diode 113 and a resistor 112 across which the resetting pulses appear and from which they are supplied to the trigger amplifier 9.

By virtue of the illustrated connections between pulse generators 7, 8 and 11, with the trigger amplifier 9, the output voltages of the three pulse generators are added so that the trigger amplifier 9 receives the resultant sum voltage. The amplifier 9 comprises two transistors 91, 92 which have an emitter resistor 94 in common. The trigger amplifier is energized from secondary winding 129 of transformer 123 in oscillator 12 through a rectifier network 95 with smoothing means. The output of amplifier 9 appears in a pulse transformer 93 for securing trigger action. The amplifier is provided with feedback connections. Each feedback circuit extends from a tap point of a voltage divider across one of the transistors to the base of the other transistor in series with a resistor 96 or 97.

The square-wave oscillator 12, being of conventional design, comprises two transistors 121 and 122 connected with the primary winding of the transformer 123 and alternately turned on and off by means of feedback windings 124 and 125. The transformer 123 is provided with another secondary winding 130 for energizing the cut-off pulse generator 10.

The pulses furnished from the trigger amplifier 9 are impressed upon the control circuit of the semiconductor switch 5 to which a protective resistor 19 is connected in parallel. It is preferable to connect a diode in parallel to the main path of the semiconductor switching device for protecting it from voltages in the blocking direction.

The cut-off (extinction) pulse generator 10 comprises another semiconductor switching device 101 preferably also a silicon controlled rectifier or other semiconductor device of thyratron-like action. A capacitor 102 and a protective diode 103 are connected parallel to the semiconductor switch 101. The semiconductor device 101 is connected through a resistor 104 to a rectifier 105 with smoothing means, here shown as a capacitor and filter choke. The rectifier is energized from the above-mentioned secondary winding 130 of transformer 123. The cut-off pulse generator 10 has the purpose of extinguishing the current flow in the semiconductor switching device 5 at the end of each pulse cycle.

Figure 3:
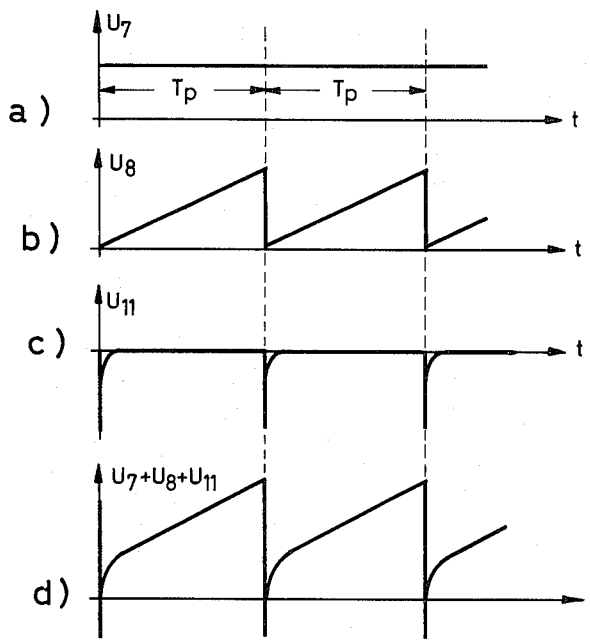
FIGS. 3 and 4 are voltage-time graphs explanatory of the regulating performance of the embodiment of FIG. 1.

The performance of the system will be explained with reference to FIGS. 3 and 4. In the illustrated graphs the abscissa denotes time $(t)$ and the ordinate indicates voltage. FIG. 3a represents the output voltage $U_7$ of the push-pull amplifier 7 for a given value of the error signal and hence for a given departure of the regulated magnitude from the desired datum value. FIG. 3b shows the output voltage $U_8$ of the saw-tooth generator 8 which increases linearly within each cycle period $T_p$ and drops back to the starting value at the end of the cycle period. FIG. 3c shows the pulses $U_{11}$ furnished from the reset pulse generator 11. FIG. 3d indicates the sum voltage $U_7 + U_8 + U_{11}$ acting upon the input circuit of the trigger amplifier 9.

Figure 4:
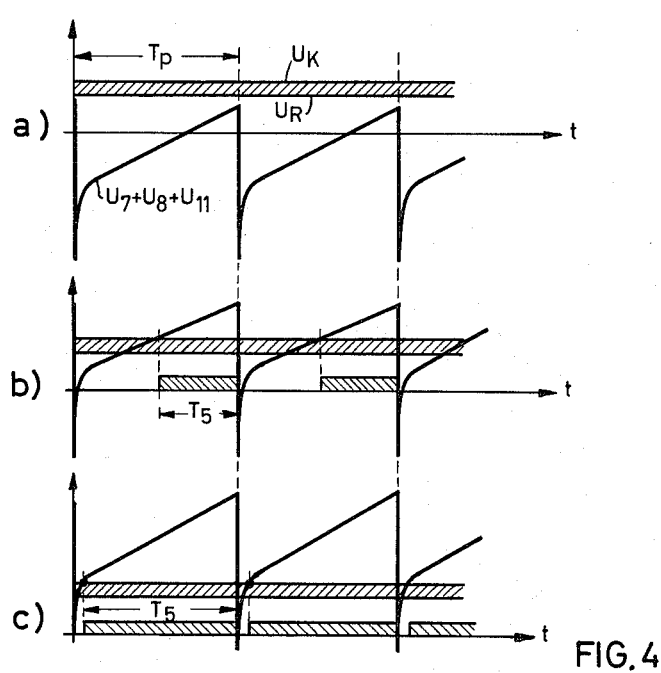

According to FIG. 4 this sum voltage will reach a different level depending upon the magnitude of the regulating departure and hence of the signal voltage. Shown in FIG. 4a by hatching is the switching range of the trigger amplifier 9 between the critical response voltage $U_K$ and the drop-off voltage $U_R$. When the actual value of the regulated magnitude, such as the output voltage of the generator 1 in FIG. 1, is considerably higher than the datum value, the sum voltage does not reach the switching range between $U_K$ and $U_R$ at any moment within the cycle period so that the semi-conductor switching device 5 is not fired. When the operation corresponds to a median control condition of the regulating system, as represented in FIG. 4b, the critical voltage $U_R$ is reached at the moment A, and the semiconductor switching device 5 is conducting during the interval $T_5$. If, according to FIG. 4c, the actual value of the regulated magnitude is much smaller than the datum value, then the interval of current conductance through the semiconductor switching device virtually extends over the entire cycle period.

The significance of the reset pulses is particularly apparent from FIG. 4c. The voltage composed only of the saw-tooth voltage and the output voltage from the push-pull amplifier 7 would never drop below the drop-off voltage $U_R$ of the trigger amplifier 9, so that the trigger amplifier might continuously retain one of its stable conditions in which the semiconductor switching device 5 will continuously conduct current. Only at considerably smaller actual values of the regulated magnitude, corresponding to an operating condition nearly equal to that of FIG. 4b, would the just-mentioned voltage alone be sufficient for again returning the trigger amplifier to the other condition. The just-mentioned source of trouble, however, is eliminated by the reset pulses furnished from the generator 11 and thus afford giving the trigger amplifier a very narrow switching range thus permitting a considerable increase in regulating accuracy.

In principle, it is not significant to the invention proper as to what particular means are employed for producing the regulating departure voltage (error signal), the saw-tooth voltage and the resetting pulses. It is only essential that the effective sum voltage is suitable for controlling a trigger amplifier which in turn produces sharp pulses for the ignition of the electronic switching device connected thereto. In this manner only few amplifying stages afford a very high switching power considerably above that attained by the know electronic regulators of the discontinuous type.

To those skilled in the art, it will be obvious from the foregoing that our invention permits of a variety of modifications and can be given embodiments other than particularly illustrated and described herein, without departing from the essential features of the invention, and within the scope of the claims annexed hereto.

We claim:
1. A discontinuous regulator system comprising cir- cuit means for providing a pilot voltage indicative of the magnitude to be regulated, said circuit means having electronic switch means for on-off regulation of said magnitude, a comparator circuit connected to said circuit means and responsive to said pilot voltage and having reference-voltage supply means to furnish an error signal dependent upon the departure of said pilot voltage from the reference voltage, a saw-tooth voltage generator of constant frequency, a trigger amplifier, circuit means connecting said generator and said comparator in voltage additive relation to said amplifier to control said amplifier by sum voltage resulting jointly from said error signal and said saw-tooth voltage, said amplifier having an output circuit connected to said switch means for closing said switch means in response to said sum voltage reaching a trigger value, and a reset-pulse voltage generator connected with said circuit means for superimposing upon said sum voltage a periodic pulse of an amplitude opposed to that of said sum voltage for reversely triggering said amplifier not later than at the beginning of each cycle period of the saw-tooth voltage, said electronic switch means including a thyristor which is periodically fired by the trigger amplifier when the signal voltage is outside the constancy limit and a cut-off pulse generator connected to said thyristor to extinguish said thyristor.

2. A discontinuous regulator system comprising circuit means for providing a pilot voltage indicative of the magnitude to be regulated, said circuit means having electronic switch means for on-off regulation of said magnitude, a comparator circuit connected to said circuit means and responsive to said pilot voltage and having reference-voltage supply means to furnish an error signal dependent upon the departure of said pilot voltage from the reference voltage, a saw-tooth voltage generator of constant frequency, a trigger amplifier, circuit means connecting said generator and said comparator in voltage additive relation to said amplifier to control said amplifier by sum voltage resulting jointly from said error signal and said saw-tooth voltage, said amplifier having an output circuit connected to said switch means for closing said switch means in response to said sum voltage reaching a trigger value, and a reset-pulse voltage generator connected with said circuit means for superimposing upon said sum voltage a periodic pulse of an amplitude opposed to that of said sum voltage for reversely triggering said amplifier not later than at the beginning of each cycle period of the saw-tooth voltage, said electronic switch means including a thyristor which is periodically fired by the trigger amplifier when the signal voltage is outside the constancy limit and a cut-off pulse generator connected to said thyristor to extinguish said thyristor, and a square-wave oscillator coupled to and energizing each of said saw-tooth generator, reset-pulse generator and cut-off pulse generator, said square-wave oscillator determining the frequency of each of said saw-tooth generator, reset-pulse generator and cut-off pulse generator.

3. A discontinuous regulator system as claimed in claim 2, wherein said thyristor comprises a silicon controlled rectifier.

References Cited by the Examiner
UNITED STATES PATENTS

| | | | |
|---|---|---|---|
| 2,545,989 | 3/1951 | Burgwin | 318—356 |
| 2,554,267 | 5/1951 | Roman et al. | 318—356 X |
| 2,600,303 | 6/1952 | Kovalsky | 318—356 X |
| 2,601,002 | 6/1952 | Picking | 318—356 X |
| 2,809,339 | 10/1957 | Guggi | 318—327 |
| 2,896,149 | 7/1959 | Lowry et al. | 322—73 X |
| 2,897,428 | 7/1959 | Wilkins | 322—73 X |
| 2,976,473 | 3/1961 | Shaw et al. | 322—73 X |
| 3,008,082 | 11/1961 | Schlicher | 322—73 X |

OTHER REFERENCES

RCA Technical Notes, Preset-Reset Thyristor Counter; by A. T. Bosso, RCA TN No. 445, January 1961, sheets 1, 2 and 3.

IBM Technical Disclosure Bulletin, "PNPN Thyristor Flip-Flop," by S. Razi, vol. 5, No. 12, May 1963, pages 59 and 60 relied on.

ARTHUR GAUSS, *Primary Examiner.*

JOHN W. HUCKERT, *Examiner.*

J. JORDAN, *Assistant Examiner.*